United States Patent
Moore et al.

(10) Patent No.: US 9,885,574 B2
(45) Date of Patent: Feb. 6, 2018

(54) COMPASS CALIBRATION

(71) Applicant: Apple Inc., Cupertino, CA (US)

(72) Inventors: Christopher D. Moore, San Francisco, CA (US); Sarah G. Barbour, San Jose, CA (US); Joshua C. Weinberg, San Jose, CA (US); Alessandro F. Sabatelli, San Francisco, CA (US); Brian Schmitt, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 748 days.

(21) Appl. No.: 14/054,802

(22) Filed: Oct. 15, 2013

(65) Prior Publication Data

US 2014/0365154 A1 Dec. 11, 2014

Related U.S. Application Data

(60) Provisional application No. 61/832,931, filed on Jun. 9, 2013.

(51) Int. Cl.
*G01C 17/38* (2006.01)

(52) U.S. Cl.
CPC .................................. *G01C 17/38* (2013.01)

(58) Field of Classification Search
None
See application file for complete search history.

(56) References Cited

U.S. PATENT DOCUMENTS

| 8,065,083 | B2* | 11/2011 | Sato | G01C 17/38 701/449 |
| 8,239,153 | B2* | 8/2012 | Piemonte | G01C 17/28 33/326 |
| 2009/0254294 | A1* | 10/2009 | Dutta | G01C 17/28 702/92 |
| 2012/0098524 | A1* | 4/2012 | Snow | G01C 17/38 324/202 |
| 2012/0127012 | A1* | 5/2012 | Gicklhorn | G06F 1/1694 341/176 |
| 2012/0206129 | A1* | 8/2012 | Mahan | G01C 17/38 324/202 |
| 2013/0201098 | A1* | 8/2013 | Schilit | H04L 12/282 345/156 |

* cited by examiner

*Primary Examiner* — An Do
*Assistant Examiner* — Renee I Wilson
(74) *Attorney, Agent, or Firm* — Morgan, Lewis & Bockius LLP

(57) ABSTRACT

A method that performs a series of interactive operations to calibrate a compass in a mobile device. The method requires a user to move the device to a variety of different orientations. In order to ensure that the device moves to a sufficient number and variety of orientations, the method instructs the user to rotate the device in a series of interactive operations. The interactive operations provide feedback to inform the user how well the user is performing the interactive operations. In some embodiments, the feedback is tactile (e.g., a vibration). In some embodiments the feedback is audible (e.g., a beep or buzz). In some embodiments, the feedback is visual (e.g., an image or images on a video display of the device). The feedback in some embodiments is continuous (e.g., a changing visual display) and in some embodiments is discrete (e.g., the device beeps after taking a good reading).

42 Claims, 12 Drawing Sheets

COMPASS CALIBRATION

BACKGROUND

A mobile device such as a cellular phone or a smart phone can now be equipped with an electronic compass. The compass calculates and provides its user with a direction, which may be a "heading" (typically given relative to the Earth's magnetic field), and/or an arrow pointing to true north. The direction information may be provided for the user's own navigation knowledge, for example, to tell him which way is north while he is walking or driving in unfamiliar surroundings. The direction information is also beneficial for use by a navigation or map application that may be running in the device.

The electronic compass obtains a measure of the magnetic field that is present in its immediate surrounding as a three-component (e.g., in x, y, and z directions) vector, using a 3-axis magnetic sensor. The sensed field contains a contribution by the Earth's magnetic field, and a contribution by a so-called local interference field. The latter is the magnetic field that is created by components in the local environment of the mobile device. This may include contributions by any magnetic component that is near the sensor, such as a loudspeaker that is built into the device. The interference field may also have a contribution due to magnetic elements found in the external environment close to the device, such as when the user is driving an automobile, riding in a train or bus, or riding on a bicycle or motorcycle.

BRIEF SUMMARY

The interactive application of some embodiments directs a user to move a device that includes an electronic compass to multiple orientations to calibrate the electronic compass. In order to ensure that the device moves to a sufficient number and variety of orientations, the interactive application of some embodiments instructs the user to rotate the device (containing the compass) in a series of interactive operations. The interactive operations provide feedback to inform the user how well the user is performing the interactive operations. In some embodiments, the feedback is tactile (e.g., a vibration). In some embodiments the feedback is audible (e.g., a beep or buzz). In some embodiments, the feedback is visual (e.g., an image or multiple images on a video display of the device). The feedback in some embodiments is continuous (e.g., a changing visual display) and in some embodiments is discrete (e.g., the device vibrates or beeps after reaching a particular orientation).

The series of interactive operations moves the device through a set of geometrically different angular orientations. In some embodiments the device has different sensors for collecting different data (e.g., magnetic sensors, accelerometers, gyroscope sensors, etc.). The interactive application of some such embodiments collects the data resulting from such movements of the device by its one or more magnetic sensors and one or more orientation sensors and analyzes the collected data to identify the interference field. The identified interference field is then subtracted from a measurement taken by the magnetic sensor, to yield the external field (which may then be further corrected to determine the true north direction).

In some embodiments, an interactive application directs a user to turn the device to a number of different orientations and a separate calibration application uses magnetic field readings to calibrate the compass. In other words, in some embodiments, the interactive application performs both the interactive and the calibration functions while in other embodiments, the interactive application performs only the interactive functions and a separate calibration application automatically performs the calibration functions.

The interactive application of some embodiments uses the series of interactive operations to calibrate the compass to identify a true north direction. In other embodiments, the interactive application uses a series of interactive operations to direct the user and the separate calibration application calibrates the compass. The interactive application or a separate calibration application of some embodiments determines a direction and strength of a magnetic field relative to a device in several orientations of the device. The interactive or separate calibration application uses the direction and strength of the magnetic field to determine an interference field that is steady relative to the device. The device subtracts the interference field from the detected magnetic field to determine the direction of the external magnetic field (e.g., the Earth's magnetic field). The device then uses the direction of the Earth's magnetic field and the location of the device to identify a true north direction.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE FIGURES

The novel features of the invention are set forth in the appended claims. However, for purpose of explanation, several embodiments of the invention are set forth in the following figures.

DETAILED DESCRIPTION

Figure 1:
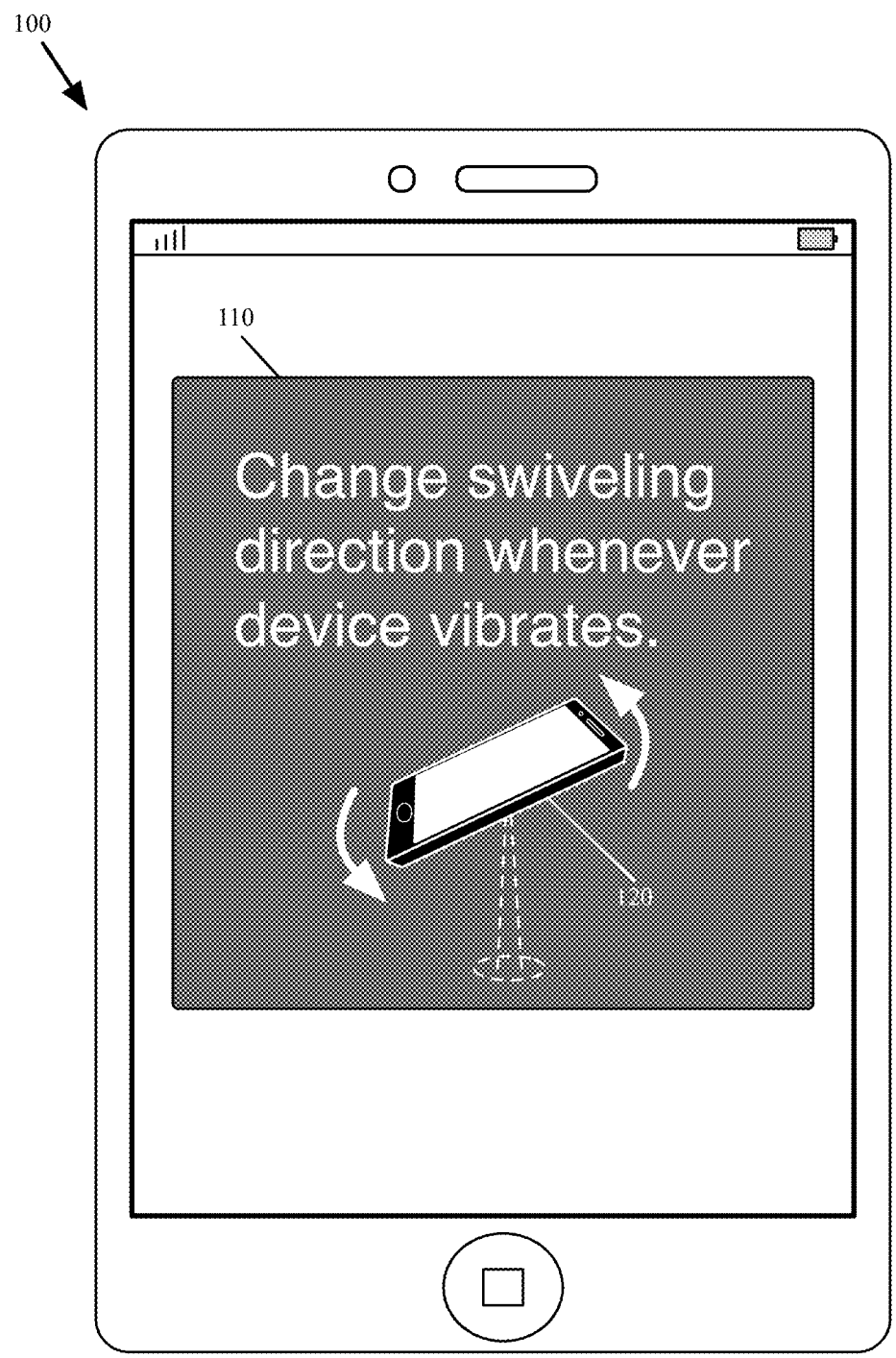
FIG. 1 illustrates an instructional screen for a compass calibration application.

In the following detailed description of the invention, numerous details, examples, and embodiments of the invention are set forth and described. However, it will be clear and apparent to one skilled in the art that the invention is not limited to be identical to the embodiments set forth and that the invention may be practiced without some of the specific details and examples discussed. It will be clear to one of ordinary skill in the art that various controls depicted in the figures are examples of controls provided for reasons of clarity. Other embodiments may use other controls while remaining within the scope of the present embodiment. For example, a control depicted herein as a hardware control may be provided as a software icon control in some embodiments, or vice versa. Similarly, the embodiments are not limited to using only the various indicators and icons depicted in the figures.

The interactive application of some embodiments provides a series of interactive operations to ensure that a device that provides an electronic compass is moved in a way that calibrates the compass. In order to ensure that the device is moved to sufficient orientations to calibrate the compass, the series of interactive operations provide a user with feedback to let the user know whether the interactive operations have been successfully performed.

In some embodiments, the feedback is tactile (e.g., a vibration). In some embodiments the feedback is audible (e.g., a beep or buzz). In some embodiments, the feedback is visual (e.g., an image or images on a video display of the device). The feedback in some embodiments is continuous (e.g., a changing visual display) and in some embodiments is discrete (e.g., the device vibrates or beeps after taking a reading in a particular orientation).

By measuring the strength and direction of the magnetic fields reaching the magnetic sensors of the device at each of multiple orientations, the interactive application or a separate calibration application can distinguish between magnetic fields that are reorienting with the device (e.g., magnetic fields from a stereo or other components of the device itself) and magnetic fields that are not reorienting along with the device (e.g., the Earth's magnetic field). If the Earth's magnetic field is the only external magnetic field, then by identifying the external field the device identifies the strength and direction of the Earth's magnetic field at that location. Thus the external field can be used to identify the direction in which the device is facing.

For brevity, the interactive application and the calibration application will be described herein as separate applications. However, in some embodiments, the interactive application includes some or all the functions described herein as part of the calibration application. For instance, in most of the examples given below, the interactive operations are performed by the interactive application (e.g., the determination of correct tilt and correct rotation speed). Also in the examples below, magnetic field analysis and determination of whether the compass is calibrated are performed by the calibration application. However, in some embodiments, interactive operations, magnetic field analysis and compass calibration are handled by a single application. In other words in some such embodiments, there is no need for exchange of data and information between two separate interactive and calibration applications of a device to calibrate the electronic compass of the device and one single application will perform all the operations.

An electronic compass indicates a direction, either by orienting a map, or providing an arrow pointing in a known direction (e.g., to true north). The device of some embodiments has a micro-electromechanical (MEMS) magnetometer or other type of magnetometer that is able to determine the magnitude and direction of the magnetic field that passes through the magnetometer. The magnetic field passing through the magnetometer is the vector combination of the external magnetic field and fields generated internally by the device (the "local interference field").

A magnetometer cannot distinguish, in a single reading, between external magnetic fields (e.g., the Earth's magnetic field, sometimes called the "geomagnetic field"), and magnetic fields generated internally by the device (the "local interference field"). The calibration method of some embodiments allows the calibration application to distinguish between externally generated and internally generated magnetic fields. The calibration application assumes that the externally generated field is the geomagnetic field and sets the north of the compass based on the externally generated field.

In some embodiments, the application uses both the external magnetic field and the geographic coordinates of the device (e.g., as determined by a GPS detector) to determine the direction of true north. The application uses the geographic location of the device because the geomagnetic field points toward the North Magnetic Pole rather than to true north. The difference between the direction of the North Pole and the North Magnetic Pole is called the "magnetic declination" and it varies based on location. The application of some embodiments uses the geographic location of the device, as compared to the location of the North Magnetic Pole, to determine the magnetic declination and thus how many degrees difference the application should apply between the direction of the external magnetic field and the direction it identifies as true north.

Figure 10:
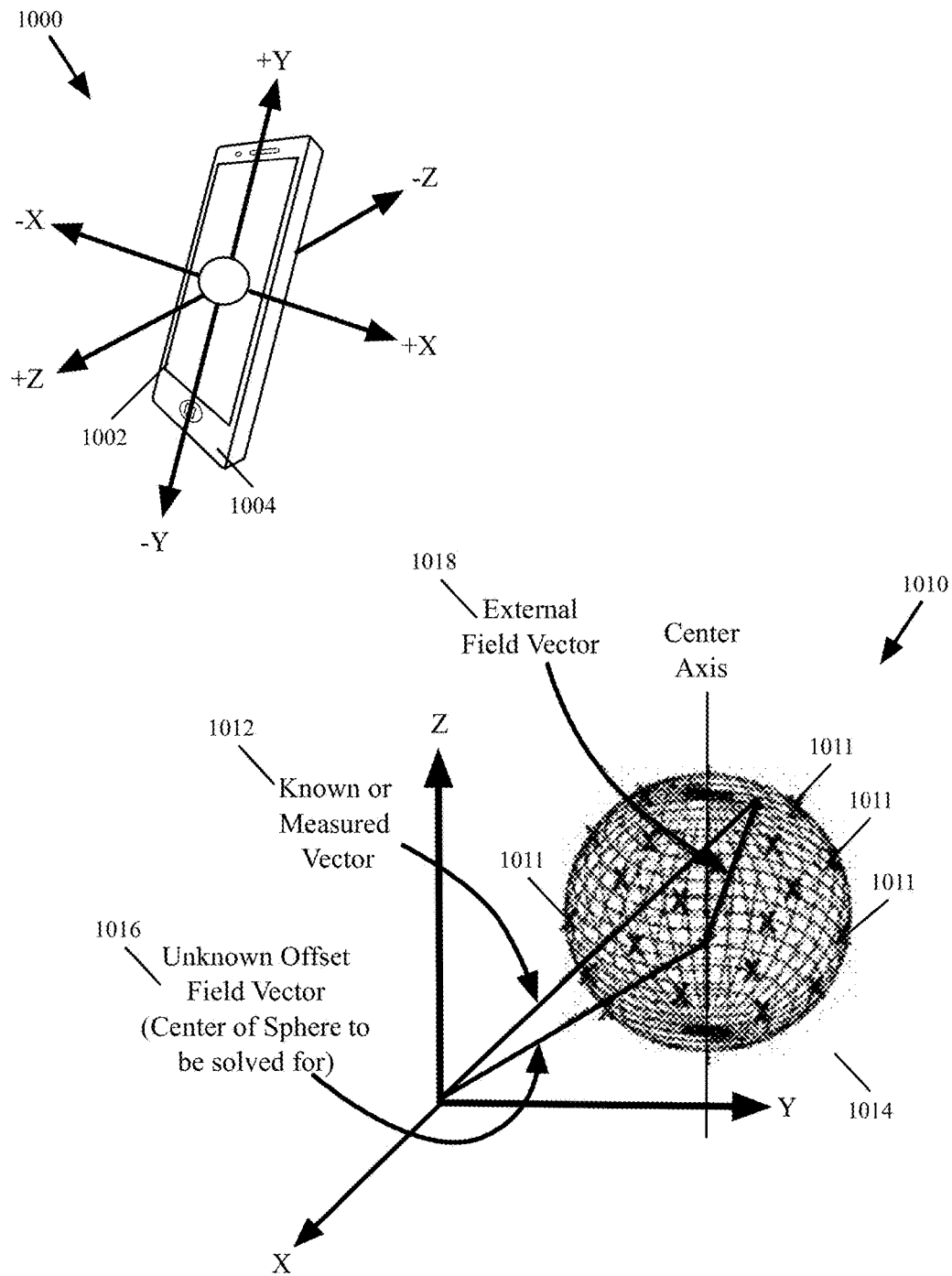
FIG. 10 conceptually illustrates the magnetic measurement space used to determine the local interference fields.

As explained further with respect to FIG. 10, below, the calibration application requires multiple readings of magnetic fields taken at different orientations of the device to identify the direction and strength of the magnetic fields that move with the device. Accordingly, the interactive applications of some embodiments prompt the user to move the device to several orientations using a series of interactive operations.

FIG. 1 illustrates an instructional screen for an interactive application. The figure includes a mobile device 100 that contains an internal compass (not shown). The device displays an instruction that includes text 110 and a diagram 120. The diagram 120 instructs the user to swivel the device 100. The text 110 instructs the user to change the swiveling direction whenever the device vibrates. By following the directions of the text 110 and diagram 120, the user puts the mobile device 100 through various motions that allow the calibration application of the mobile device to calibrate the internal compass.

In some embodiments, the calibration application of the mobile device 100 correlates the motions with the direction and strength of the magnetic field passing through the device 100 to reach the internal magnetic sensors. The device 100 determines what motions the user is putting the device through by using orientation sensors (e.g., accelerometers and/or gyroscope sensors) of the device 100.

The application of some embodiments uses results from the orientation sensors to determine the orientation of the device. The sensors in some embodiments include one or more of: an accelerometer, an inertial sensor, a gyroscopic sensor, a tilt sensor, a yaw sensor, and/or a pitch sensor. In some embodiments the orientation sensors also include a triangulation-based locating device, such as a global positioning system (GPS) or a system for triangulating a location based on cell tower positions. The orientation sensors of some embodiments are integrated in the mobile device. Specifically, they are fixed so as to be immobile relative to one or more magnetic sensors of the device. For example, an orientation sensor may be in the physical form of an accelerometer chip that is installed on the same circuit board as an electronic compass chip (which contains a magnetometer circuit). The circuit board being fixed relative to the device (e.g., attached to the external shell of the device). Among other operations, the orientation sensors of some embodiments allow applications or operating systems of the device to determine which direction is down (e.g., determine which direction gravity points relative to the device).

Figure 2:
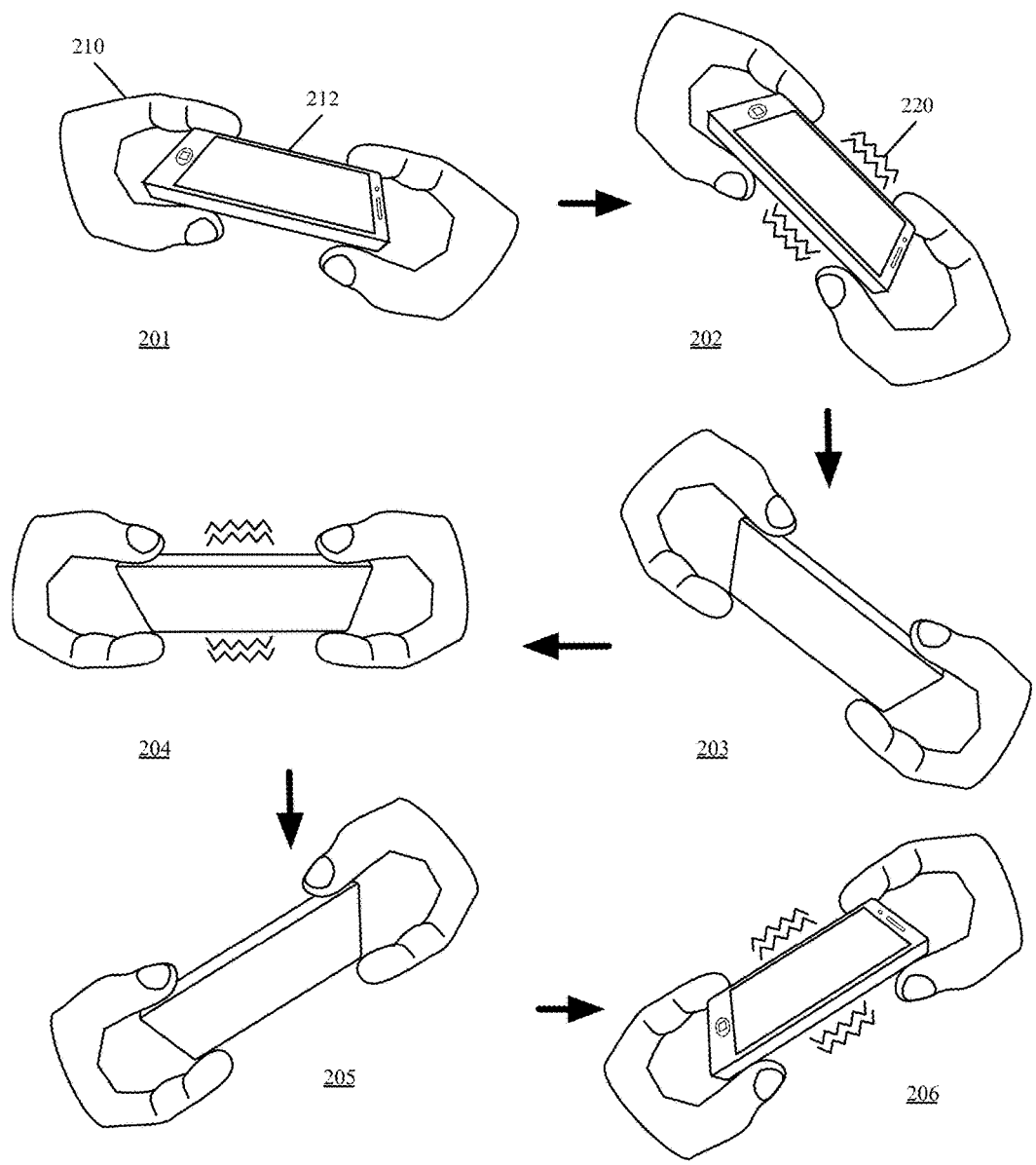
FIG. 2 illustrates a series of interactive operations with tactile feedback.

FIG. 2 illustrates a series of interactive operations with tactile feedback. The figure is shown in 6 stages 201-206. In stage 201, the user 210 begins to tilt a device 212 to the right. In some embodiments, the user would do this in response to an instruction like the one shown in text 110 and diagram 120 of FIG. 1. In some embodiments, a compass calibration application takes a reading of the magnetic field and the orientation of the device 212 before the user 210 begins to tilt the device. In some embodiments, the compass calibration application takes readings of the magnetic field and the orientation of the device regularly, whether or not the interactive application is providing the series of interactive operations. In some such embodiments, the interactive application provides instructions to the user to perform the series of interactive operations when the calibration application indicates that calibration is required. That is, when the regular readings have proven inadequate to allow automatic calibration without user intervention.

In some embodiments, the calibration application takes multiple readings of the magnetic field strength and direction while the user 210 tilts the device 212. In stage 202, the user 210 has tilted the device 212 far enough to the right. When the user has tilted the device 212 far enough to the right, the calibration application can get a sufficiently variant reading (from the reading the device 212 took before the user 210 began to tilt the device 212). Accordingly, the interactive application commands the device 212 to vibrate (as shown by vibration symbols 220) to provide feedback for the user. The feedback tells the user 210 that the device 212 has been tilted far enough to the right. The user 210 then follows the text 110 instruction of FIG. 1 and begins to swivel the device 212 in another direction in stage 203. In this case, the user 210 tilts the device so that the face of the device is pointed away from the user. The device 212 vibrates in stage 204 after the device has been moved sufficiently far away from the previous direction for the application to get a sufficiently variant reading.

The vibration in stage 204 provides feedback to the user 210 to turn the device 212 in a different direction. Accordingly, the user 210 begins tilting the device 212 to the left in stage 205. In stage 206, the user 210 has moved the device 212 far enough to the left that the application can get a sufficiently variant reading of the magnetic field. Therefore, the device 212 vibrates again in stage 206. In some embodiments, the interactive application determines whether the device has moved sufficiently by using the orientation sensors and without using the magnetic field sensor. That is, the interactive application of such embodiments provides the calibration application with the opportunity to take a reading of the magnetic field, but does not prompt the calibration application to take the magnetic field reading or verify that a magnetic field reading has been taken at that orientation. In other embodiments, the interactive application does prompt the calibration application to take the magnetic field reading and/or verifies that a reading has been taken at that orientation.

Figure 3:
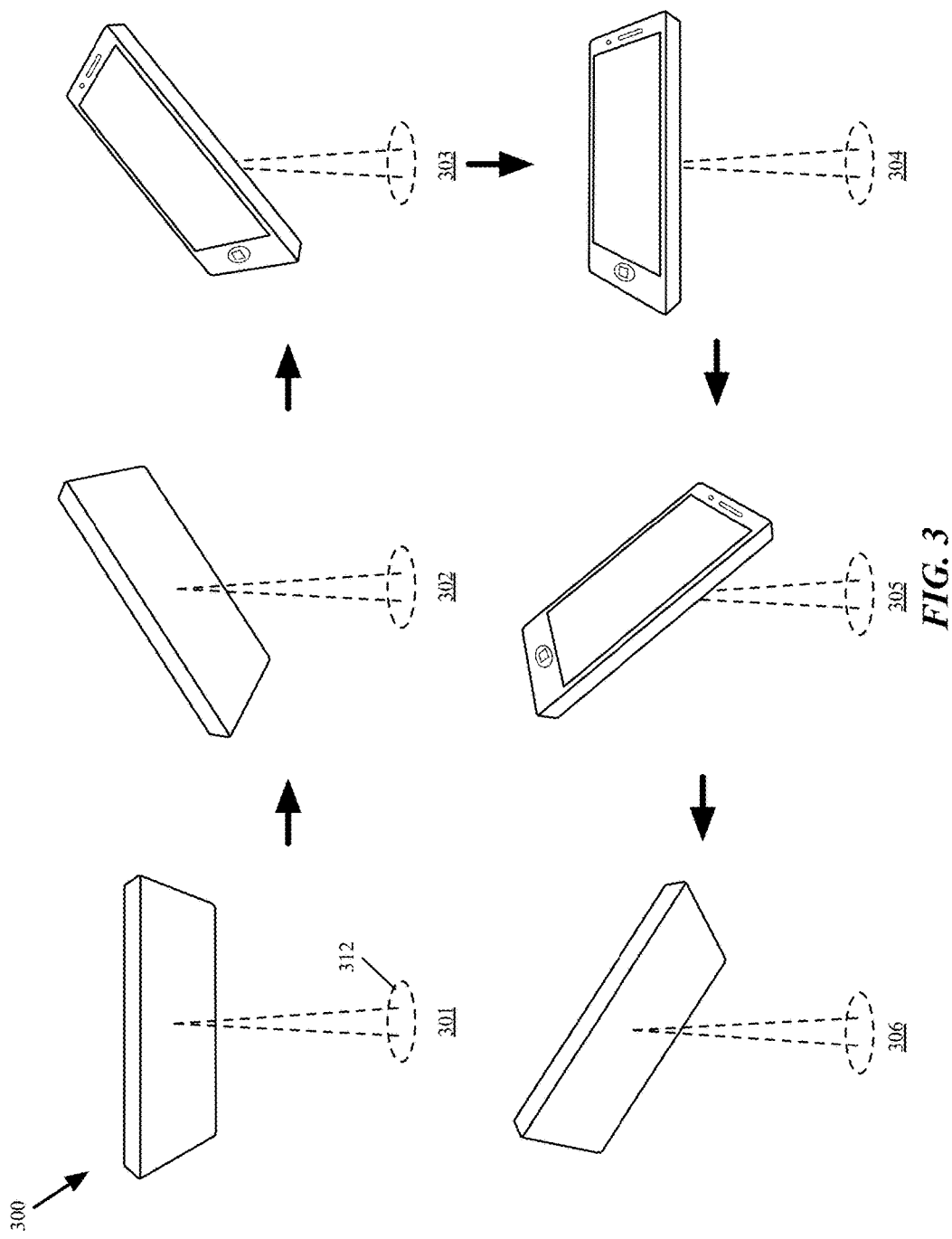
FIG. 3 illustrates a series of motions of a device that provides sufficient readings for calibrating an electronic compass of the device.

FIG. 3 illustrates a series of motions of a device that provides an opportunity for sufficient magnetic field readings to calibrate the electronic compass of the device. "Sufficient readings" in this case means enough readings from far enough spread out orientations that the calibration application can accurately calculate the local interference field. The figure is shown in 6 stages 301-306. The figure shows device 300 rotating around virtual pin 312. The pin 312 conceptually represents a pivot point around which the user (not shown) rotates the device 300. In stage 301, the device is tilted away from the user (not shown). In stages 302-306 the user rotates the device around the pin 312 in a counter-clockwise direction as seen from above. As used herein, the "tilt angle" is the angle between the device and the down direction (i.e., the way gravity points). The "rotation angle" represents the angle about an axis in the direction of gravity and in which the face of the device is pointing relative to an arbitrary direction at right angles to gravity (e.g., front, back, left, or right, or the direction at which the interactive application begins to provide feedback).

The compass calibration application identifies a series of magnetic field vectors, each representing the direction and strength of the detected magnetic field when the device is oriented in a particular direction. The external magnetic field vector points in a particular direction relative to the device 300. If the user rotates the device around a particular line, (e.g., the line from the center of the base of virtual pin 312 through the point of virtual pin 312), then from the perspective of the device, the local interference field remains constant and the external magnetic field revolves around the device.

The previously mentioned features and other features will be further described below in more detail in the following sections. Section I describes several visual feedback methods. Section II describes the interaction of the applications and sensors of the device of some embodiments. Section III describes how the calibration application of some embodiments uses the measurements to calibrate the compass. Section IV describes a mobile device used to implement applications of some embodiments. Section V describes an electronic system (e.g., a tablet computer) used to implement applications of some embodiments.

I. Visual Feedback Methods

In some embodiments, visual cues are used to provide feedback to a user. The visual cues of some embodiments identify when the calibration application has had the opportunity to take sufficient readings from a particular direction. The visual cues of some embodiments also identify how close the calibration application is to having enough readings over all. The visual cues of other embodiments identify how many widely spread orientations the device has reached.

Figure 4:
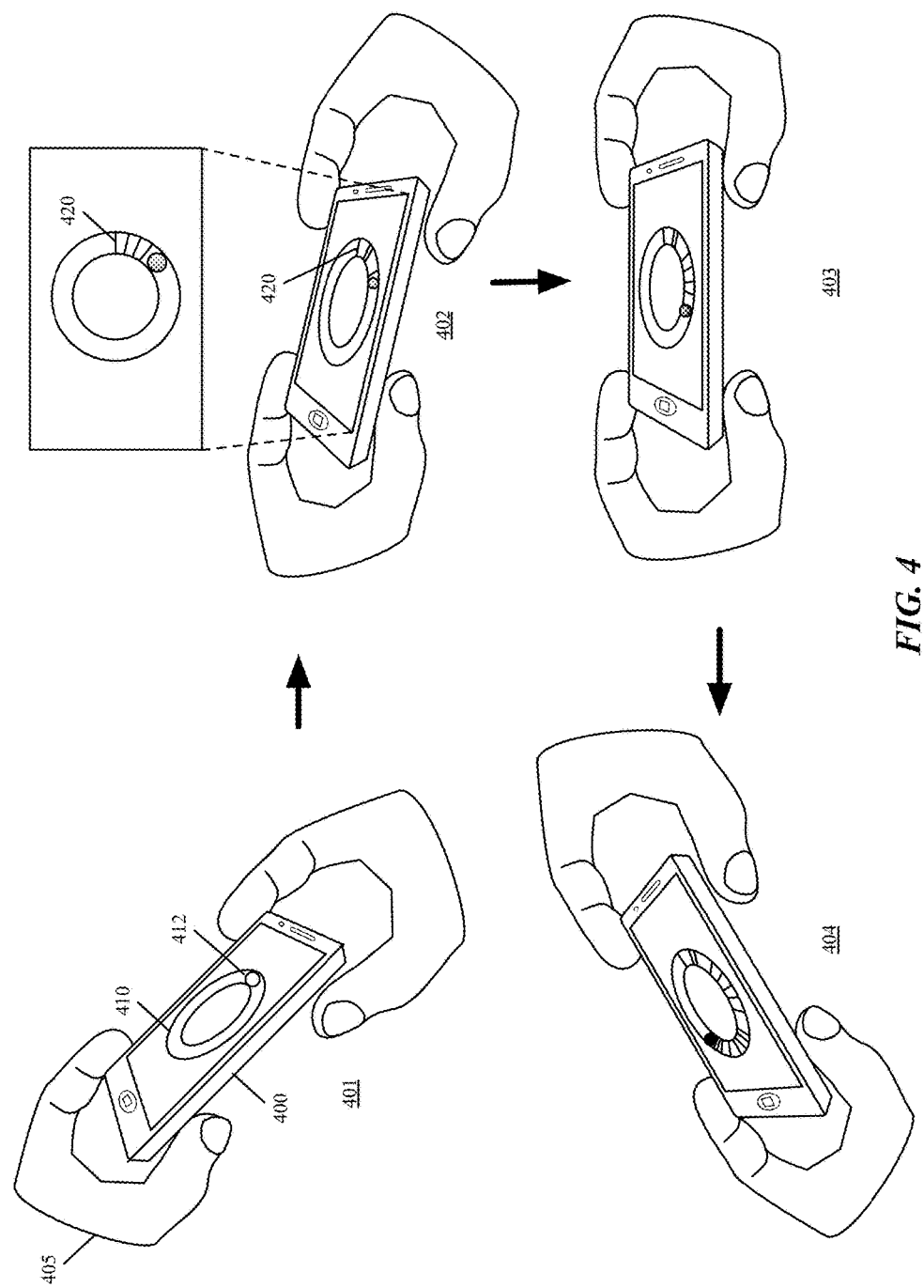
FIG. 4 illustrates visual feedback given to a user while an application of some embodiments calibrates a device.

FIG. 4 illustrates visual feedback given to a user by an interactive application to provide an opportunity for a calibration application to calibrate a compass. The figure includes device 400 and user 405 in 4 stages 401-404. In each stage 401-404, the device displays a track 410 with a ball 412 on the track. The ball 412, in each stage 401-404, is on the side of the track 410 closest to the ground (not shown). That is, the interactive application uses the ball 412 to indicate which direction has been identified by the application as "down". In some embodiments, the application uses one or more accelerometers, gyroscope sensors, etc. (not shown) of the device to determine which direction (relative to the device 400) is down. In stage 401, the ball 412 is white and the track is empty. In the illustrated embodiment this indicates that the calibration application has not begun to take readings. The color of the ball 412 (e.g., how dark or light the ball is) in some embodiments is an indicator of how close the calibration application is to having enough readings to calculate the local interference field. Therefore, in the illustrated embodiment, as more magnetic field readings are taken, the application darkens the ball 412 more. In contrast, in other embodiments, the color of the ball 412 is an indicator of how many different good orientations (e.g., orientations within a threshold range of tilt angles and passed at a slow speed) the user has moved the device to. In such embodiments, the greater the number of good orientations the user has moved the device to, the more the color of the ball changes.

In stage 402, the user 405 has rotated the device 400 around so that the lower right of the track 410 is closest to the ground. Accordingly, the ball 412 has moved to the lower right of the track 410. Additionally, the track 410 now displays lines 420 that indicate that the user was moving the device below a particular speed and within a threshold range of tilt angles when that side of the track was down. In some embodiments, the lines 420 approximate (rather than exactly identifying) the location of the ball when the reading was taken (e.g., the locations at which lines can grow are evenly spaced around the circle, but the readings are spaced unevenly). In this stage 402, the calibration application has had the opportunity to take several magnetic field readings while the device 400 was being rotated. Accordingly, the application displays the ball 412 as darker in stage 402 than in stage 401. Stage 402 also provides a top down view of the display of the device 400 to more clearly show the feedback mechanism of some embodiments.

In some embodiments, the interactive application provides feedback to cause the user to rotate the device at a slow speed. For example the interactive application of some embodiments provides lines 420 (as positive feedback) only when the device is rotated below a threshold speed. The interactive application provides such positive feedback because, when the device is rotated faster than a threshold speed, the calibration application gets less accurate readings from the magnetometer and/or the orientation sensors. For example, the calibration application would not get accurate readings because the direction and/or magnitude of the measured magnetic field changes too fast and/or because the orientation sensors take less accurate readings at high rotation rates, etc. In other embodiments, the device can take readings at any speed a user can produce.

In stage 403, the ball 412 gets darker and the application displays more lines 420 on the track. By stage 404, the calibration application has taken magnetic readings as the user moved the device 400 through about ¾ of a circle. In some embodiments, the local interference field can be calculated from a threshold number of readings, but the calibration application takes additional and varied readings for increased accuracy. In some embodiments, the calibration application does not require readings from all the way around the track. The embodiment of FIG. 4 is such an embodiment. In stage 404, the calibration application has taken enough readings to identify the magnitude and direction of the local interference field and therefore the interactive application displays the ball 412 as black.

In the embodiment of FIG. 4, the calibration application sends data to the interactive application indicating how close the calibration application is to having enough data to calibrate the compass (e.g., the calibration application sends the number of good readings taken or the number of good readings still required to calibrate the compass). In that embodiment, the interactive application uses that data to determine what color to make the ball. However, in some embodiments in which the calibration application is (1) separate from the interactive application and (2) does not provide data to the interactive application about individual readings, the ball will be displayed in a color based on the number of orientations that have been reached, without the interactive application knowing whether the calibration application has taken a particular fraction of the number of readings used to calibrate the compass.

Although the illustrated embodiment shows the ball 412 darkening from white to black, one of ordinary skill in the art will understand that in other embodiments, the application uses other transitions to indicate how many readings it has taken (or how many orientations have been reached). For example, the application of some embodiments starts with a red ball and transitions to a green ball, starts with a black ball and transitions to a white ball, etc. Some embodiments combine a change of color and a change of brightness (e.g., the ball transitions from dark red to bright green).

Figure 5:
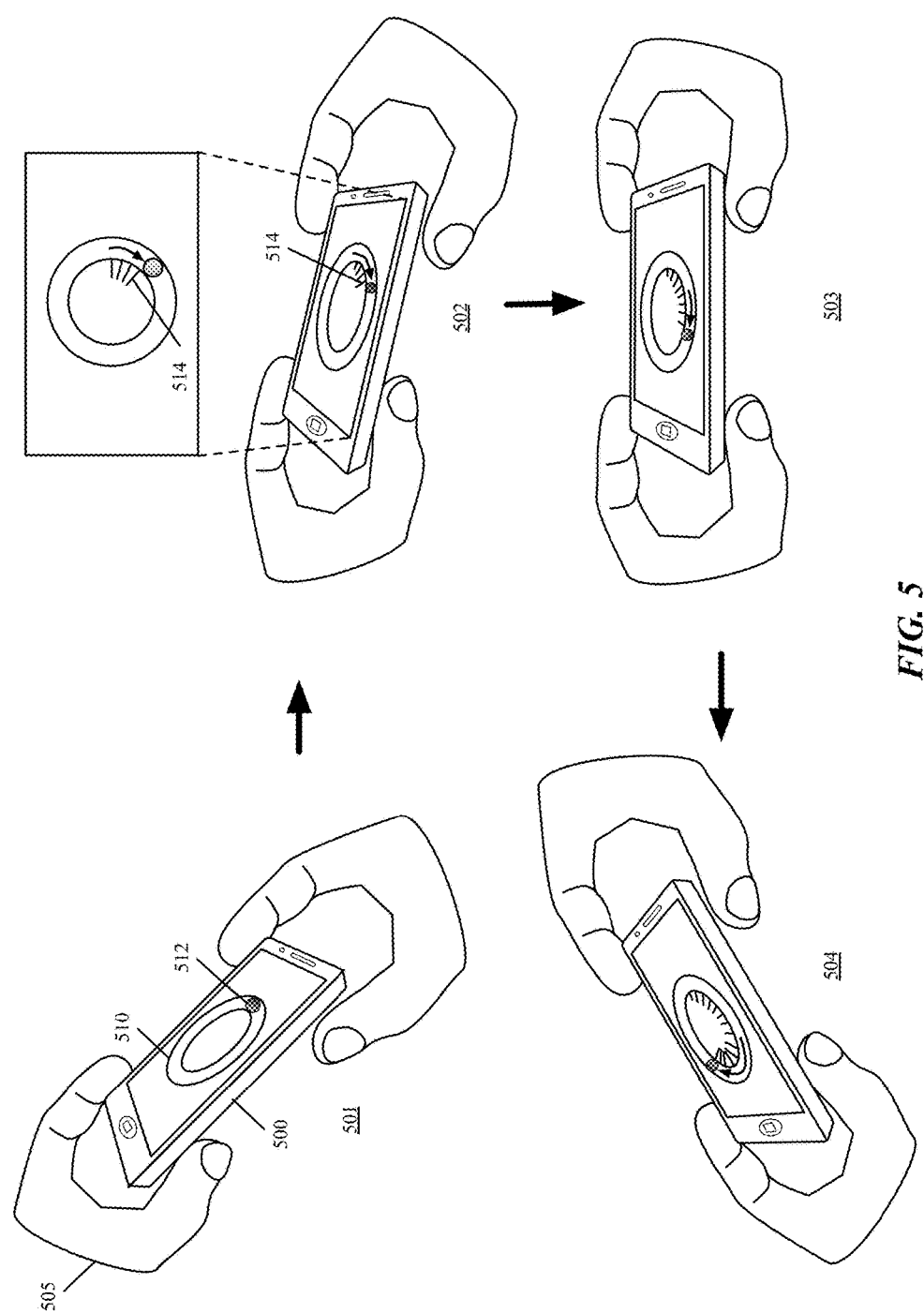
FIG. 5 illustrates an application of some embodiments that provides lines on the inner edge of a track for visual feedback when calibrating a compass.

FIG. 5 illustrates an interactive application of some embodiments that provides lines on the inner edge of a track for visual feedback. The figure includes device 500 displaying track 510 and ball 512 in 4 stages 501-504. A user 505 rotates the device 500 and the ball 512 goes around the track 510 to the lowest point on the track 510. In this embodiment, lines 514 grow inward from the inner edge of the track 510 to indicate that readings have been taken when the ball was at the locations of the individual lines. As was the case in FIG. 4, the calibration application does not require the device to be rotated all the way around (such that the ball goes all the way around the track) in order to calibrate the compass.

In some embodiments the lines 514 spread in from the location of the ball 512. In other embodiments, the lines spread in from an evenly spaced location (e.g., a location spaced every 5 degrees, every 10 degrees, etc.) closest to the ball 512. In stage 501, the interactive application has not provided any lines. In stage 502, the interactive application has determined that the device was sufficiently tilted and rotated slowly enough to allow the calibration application to take good readings while the device was in the locations indicated by lines 514. Stage 502 also provides a top down view of the display of the device 500 to more clearly show the feedback mechanism of some embodiments. In stages 503 and 504, the interactive application has identified further orientations (indicated by additional lines 514) at which the device was tilted sufficiently and rotated slowly enough for the calibration application to take good sensor readings.

Figure 6:
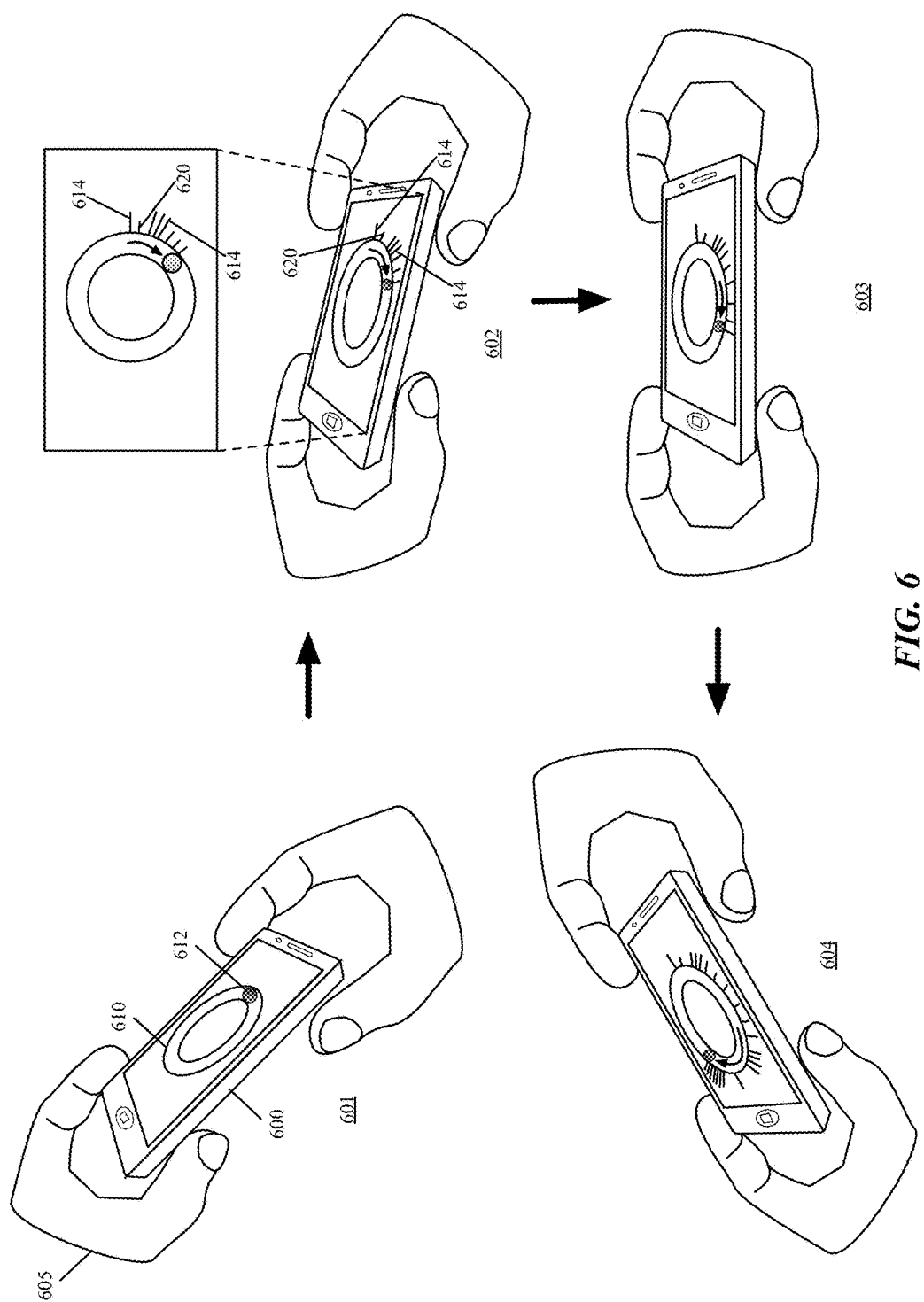
FIG. 6 illustrates an application of some embodiments that provides lines from an outer edge of a track for visual feedback when calibrating a compass.

Applications of other embodiments provide other feedback mechanisms. FIG. 6 illustrates an interactive application of some embodiments that provides lines from an outer edge of a track for visual feedback. The figure includes device 600 displaying track 610 and ball 612 in 4 stages 601-604. A user 605 rotates the device 600 and the ball 612 goes around the track 610 to the lowest point on the track

610. In this embodiment, full lines 614 and short lines 620 grow outward from the outer edge of the track 610 to indicate that readings have been taken when the ball was at the locations of the individual lines. The differences between full lines 614 and short lines 620 will be further described below. As was the case in FIG. 4, the calibration application does not require the device to be rotated all the way around (such that the ball goes all the way around the track) in order to calibrate the compass.

Stage 601 provides a view of the device 600 before the application provides any feedback. Stage 602 provides a view of the device 600 after the interactive application has provided some feedback in the form of lines 614 and 620. Stage 602 also provides a top down view of the display of the device 600 to more clearly show the feedback mechanism of some embodiments. Stage 603 and 604 provide views of the device 600 after progressively more orientations are reached at a sufficient tilt angle and proper speed.

In the embodiments of FIGS. 4 and 5, the lines were displayed when good readings were taken and not displayed when good readings were not taken. However, in the application illustrated in FIG. 6, a more specific type of feedback is provided. Specifically, when the device 600 is not tilted far enough away from being face up ("face up" defined as the display facing directly away from the down direction) and/or when the user 605 rotates the device 600 too fast (beyond a threshold speed), the application displays short lines 620. In contrast when the device 600 is tilted far enough away from being face up (but not too far) and when the user 605 rotates the device 600 slowly enough, the application displays full length lines 614. In some embodiments, the lengths of the short lines are limited to a specific set of lengths (e.g., 5% or 50% of the length of lines 614) depending on whether the tilt angle and/or speed were fair (50% of full length) or poor (5% of full length).

In some embodiments, the user 605 can rotate the device 600 back so that the ball 612 returns to a portion of the track at which the interactive application placed short lines 620. In some such embodiments, if the device is properly tilted and moved slowly enough upon returning to that portion of the track, the interactive application will replace the short lines 620 at that portion of the track with longer lines 614. In some embodiments the lines 614 and 620 spread out from the location of the ball 612. In other embodiments, the lines spread out from an evenly spaced location (e.g., a location spaced every 5 degrees, every 10 degrees, etc.) closest to the ball 612.

Figure 7:
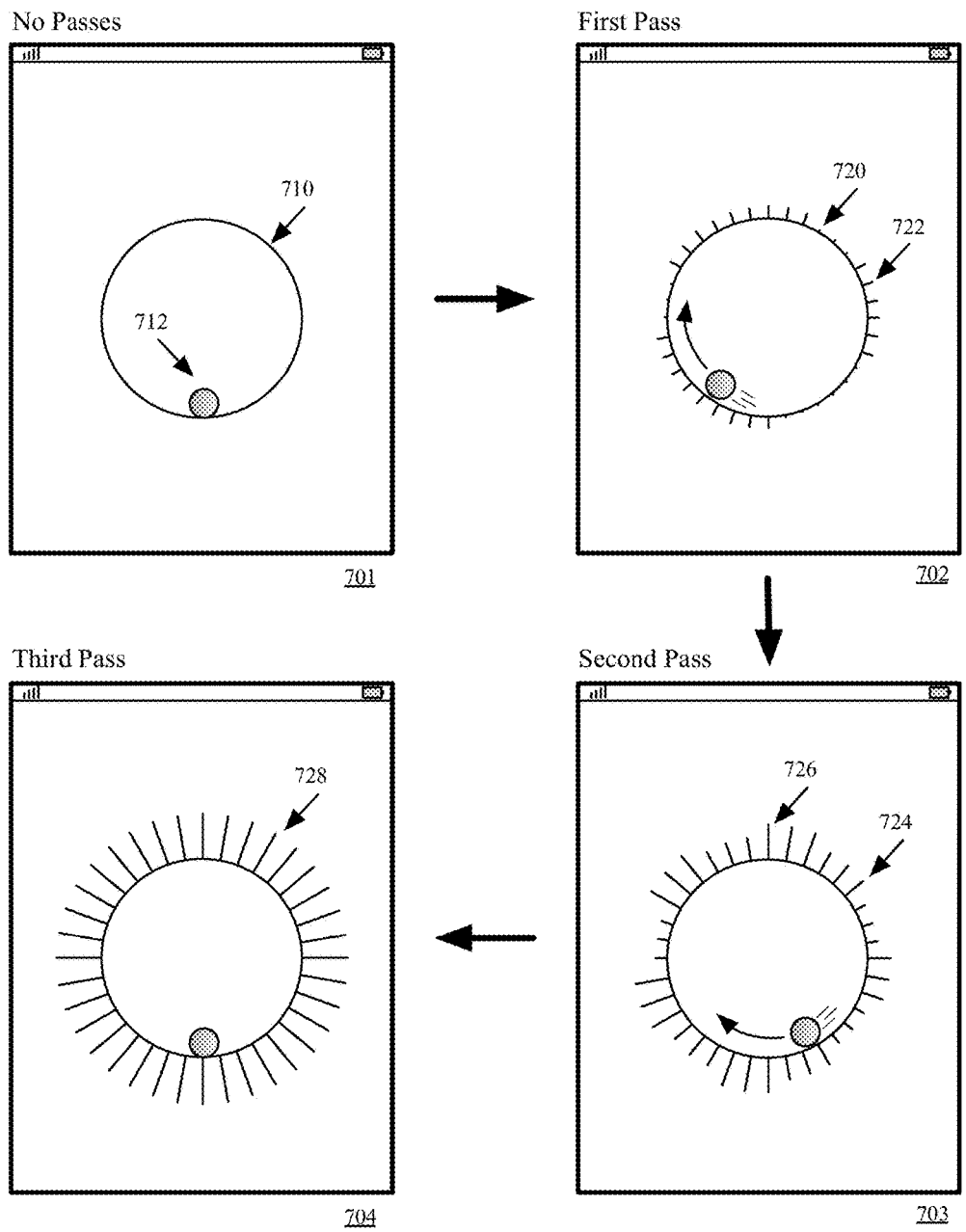
FIG. 7 illustrates feedback of some embodiments when repeated passes of the same rotation angle are used.

As mentioned with respect to FIG. 6, in some embodiments, the interactive application provides feedback that indicates a less than perfect rotation speed or tilt angle of the device. Furthermore, in some embodiments, the user can return the device to the previous rotational angel, but with a better speed and tilt angle. FIG. 7 illustrates feedback of some embodiments when repeated passes of the same rotation angle are used. The figure is shown in four stages 701-704. For clarity, the stages each show the feedback displayed at different times, but do not show the rotation of a device. In stage 701, the interactive application has just begun to provide feedback, the device has just been tilted and no lines have been displayed yet. This stage shows just a track 710 and a ball 712. The track is an alternate embodiment of the tracks shown in FIGS. 4-6. In this embodiment, the interactive application does not display an inner track, but the ball 712 stays on the track 710.

In stage 702, the user has rotated the device so that the ball 712 has moved around the track 710 once. The user has had varying degrees of success as indicated by the feedback of stub lines 720 and quarter lines 722. The interactive application is still displaying the track and ball. In some embodiments this means that the calibration application has not yet calibrated the compass. In stage 703, the user has rotated the device so that the ball 712 has made a second pass around the track 710. During the second pass, the user rotated the device at a better speed and tilted it at a more proper angle when the ball was on some parts of the track that had previously received quarter lines 722 and stub lines 720 as feedback. Accordingly, the interactive application upgraded the feedback on those parts of the track. Accordingly, in stage 703, some stub lines 720 and quarter lines 722 from the previous pass have grown into longer lines including some half lines 724 and three-quarter lines 726.

In stage 704, the user has rotated the device so that the ball has been around the track for three full passes. In the third pass, the user rotated the device at the right speed and tilted it at the correct angle as the ball passed the remaining low feedback areas of the track. Accordingly, the interactive application is displaying full lines 728. In some embodiments, the calibration application should calibrate the compass at or before the point when all lines are full. Accordingly, in some embodiments, the interactive application will be notified that the compass is calibrated and switch itself off when (or before) all lines are full. In some embodiments, if the compass is not calibrated by the time the lines are all full, the interactive application resets the feedback to nothing (i.e., stage 701) or reduces the length of the lines so that the interactive application will be able to display further feedback.

In some embodiments, the feedback lines (1) increase in length only when the tilt angle and/or rotation speed, as the ball passes part of the track, are better than what they were in any previous pass and (2) stay the same length when the tilt angle and/or rotation speed are worse than what they were in the best prior pass. However, in some other embodiments, the feedback lines increase in length in each pass, whether or not the tilt angle and/or rotation speed are better than what they were in any previous pass. In still other embodiments, feedback lines decrease in length if the tilt angle and/or rotation speed (while the ball passes a line) are worse than the tilt angle and rotation speed (while the ball passed the same line) in the previous pass.

Although FIGS. 2, 4, 5, 6, and 7 each shows different feedback mechanisms, some embodiments provide any possible combination of the described feedback mechanisms. For example, the application of some embodiments displays lines that grow inward and are displayed in different lengths. As another example, the application of some embodiments provides both lines that grow outward and a ball that changes colors. Some embodiments even provide multiple types of feedback. For example, the applications of some embodiments provide a continuous visual feedback such as displaying a track with a ball and lines and provide a discrete tactile and/or audible feedback such as vibration and/or a beep when the device has been in one orientation longer than a threshold time.

Figure 8:
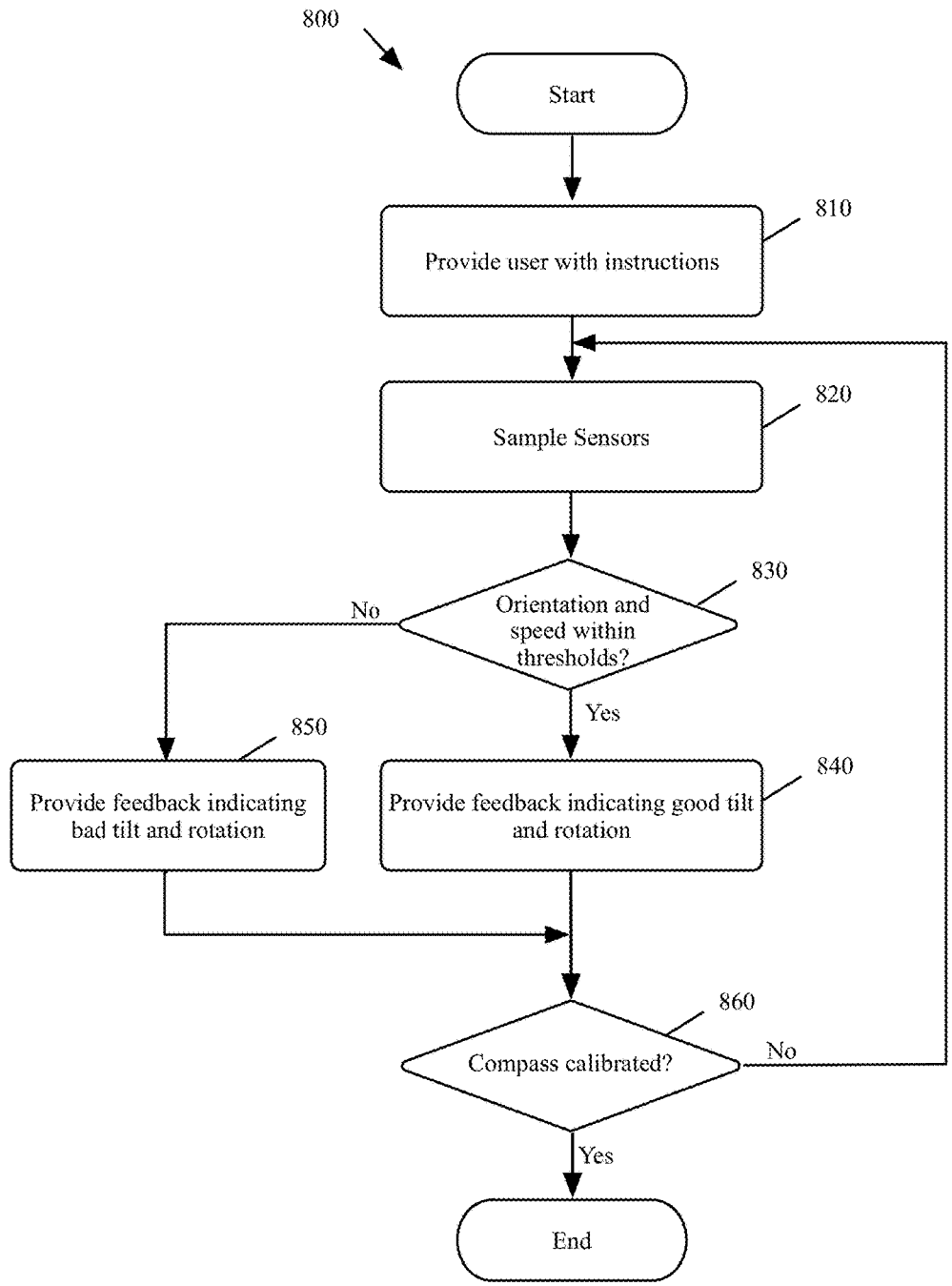
FIG. 8 conceptually illustrates a process of some embodiments for taking measurements in a series of interactive operations.

The applications of some embodiments use a method that continues to provide a series of interactive operations until the calibration application takes enough good readings to calibrate the compass (i.e., to accurately identify the local interference field). FIG. 8 conceptually illustrates a process 800 of some embodiments for providing a series of interactive operations until a calibration application has calibrated an electronic compass. The process 800 provides (at 810) a user of the device with instructions. The instructions provide an initial indication of what the user should do to enable the calibration application to properly calibrate the compass of the device. An example of such instructions is shown in the text 110 and diagram 120 of FIG. 1. However, applications of other embodiments provide other types of instructions. For example, some embodiments provide an instruction to tilt the device and slowly rotate it about a point, to move a ball around a track, etc. Some embodiments provide instructions that identify the types of feedback that will be received from the interactive application. For example, instructions might say that when the device is tilted correctly, long lines will grow from the track, when the device is tilted incorrectly, short lines will grow. Interactive applications of other embodiments do not display such detailed instructions.

The process 800 then samples (at 820) sensors of the device. In some embodiments, the process 800 uses gyroscopes and/or accelerometers to measure the orientation of the device (e.g., the orientation of the device relative to the down direction). In some embodiments, the process uses gyroscopes and/or accelerometers to determine how fast the device is rotating. In some embodiments, the calibration application takes magnetic field readings and orientation readings while the device is being rotated by the user.

The process 800 then determines (at 830) whether the orientation and rotational speed of the device are within a threshold set of ranges. In some embodiments, an orientation within the threshold range is an orientation in which the device is tilted more than a first threshold angle from a face up position. In some embodiments, for an orientation to be within the threshold range, the device must also be tilted less than a second threshold angle from the face up position. Similarly, a rotational speed within a threshold range is a rotational speed below a first threshold rotational speed. In some embodiments, a rotational speed within the threshold range is a rotational speed that is also above a second threshold rotational speed.

When the process 800 determines (at 830) that the orientation and speed are within the threshold values, the process 800 provides (at 840) feedback indicating to the user that the orientation and speed are within the threshold values. Multiple examples of such feedback are provided in previous figures. In FIG. 2, the feedback is tactile. The device of FIG. 2 vibrates after the application reaches a threshold tilt angle. In FIGS. 4-6 various forms of visual feedback are given. In FIG. 4 the application draws lines on a track, each line corresponding to an orientation where the application has been within the threshold angle and moved slowly enough. Furthermore, in FIG. 4 the ball darkens when a good reading has been taken or when a new orientation has been reached. In FIG. 5 the application draws lines inward from the track. In FIG. 6 the application draws lines outward from the track. In the case of FIGS. 6 and 7 the length of the line provides an indicator to the user of how close to the threshold values the orientation and rotational speed corresponding to that line were. Other embodiments use other feedback mechanisms. For example, the interactive applications of some embodiments provide an audible sound when a threshold orientation has been reached. In some embodiments with either (1) a single application performing both interactive and calibration applications, or (2) a calibration application that provides feedback about individual readings to an interactive application, the interactive application provides an audible sound when a good reading is taken by the calibration application.

When the process 800 determines (at 830) that the orientation and/or speed are not within the threshold values, the process 800 provides (at 850) feedback indicating that the orientation and/or speed are not within the threshold values. In the embodiments of FIGS. 4, and 5, the feedback indicating an out of threshold orientation and/or speed is that the ball moves on without leaving a line. In the embodiment of FIG. 2 the device does not vibrate when the proper tilt angle has not been reached. In some embodiments consistent with FIG. 6, the application draws a very short line when the orientation and/or speed are far from the threshold values and a medium line when the orientation and/or speed are closer to the threshold values, but not within the threshold values.

After providing feedback (at 840 or 850), the process determines (at 860) whether the calibration application has calibrated the compass. In some embodiments, the calibration application sends a signal to the interactive application indicating that the compass is calibrated after the calibration application obtains enough magnetic field readings from sufficiently different orientations to accurately determine the local interference field. When the process 800 determines (at 860) that the calibration application has not calibrated the compass, the process 800 returns to operation 820 to measure the orientation and magnetic field again.

When the process 800 determines (at 860) that the calibration application has calibrated the compass, the process 800 ends. After the process 800 ends, a compass application can determine the direction of the external field by measuring the orientation of the device and the magnetic field at the magnetometer and subtracting the calculated local interference field from the measured magnetic field. More details about how the calibration application of some embodiments calibrates the compass are provided below.

II. Interactive and Calibration Application Data

Figure 9:
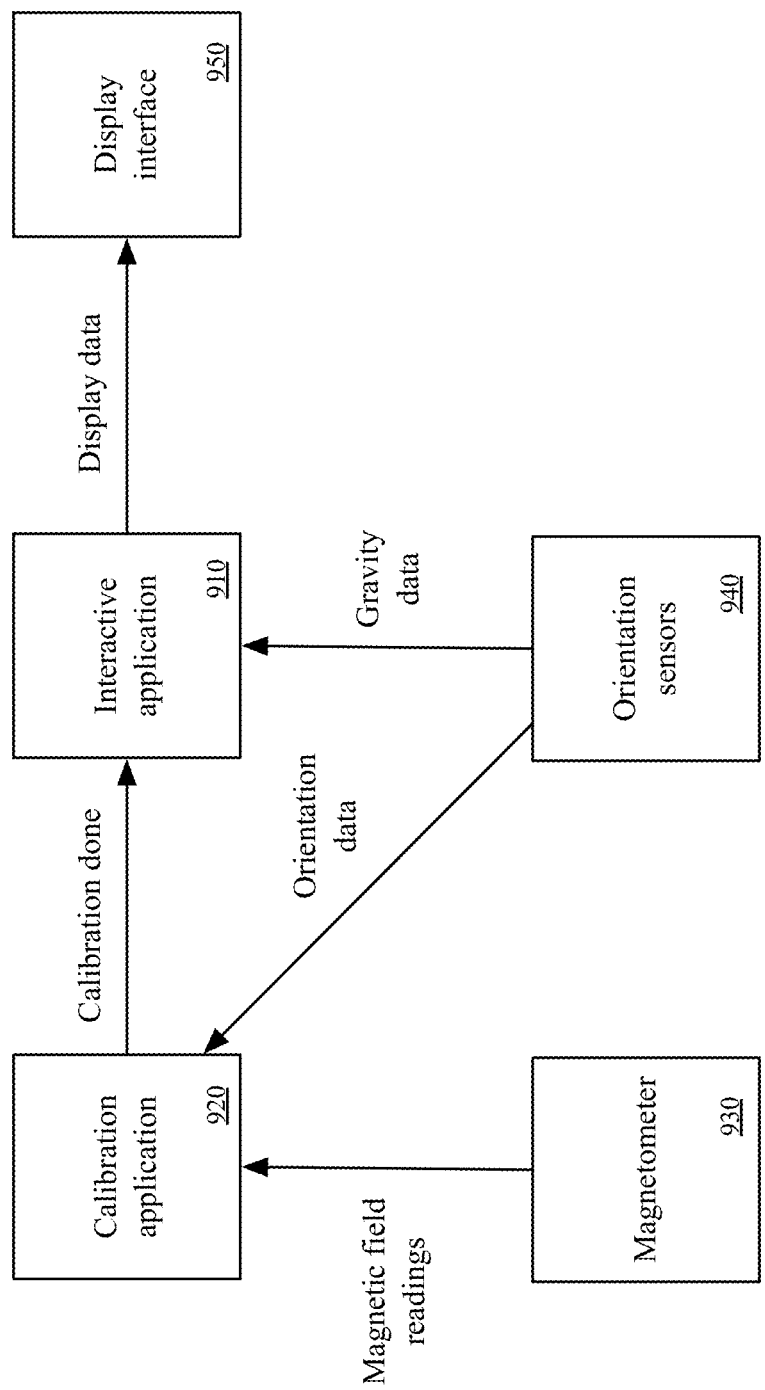
FIG. 9 conceptually illustrates sensors and applications of the device of some embodiments.

In some embodiments, the interactive application and the calibration application receive data from various sensors of the device with the electronic compass. FIG. 9 conceptually illustrates sensors and applications of the device of some embodiments. The figure includes interactive application 910, calibration application 920, magnetometer 930, orientation sensors 940, and display 950.

The interactive application 910 provides a user with feedback for a series of interactive operations. The operations rotate the device so that the calibration application 920 can take readings used to calibrate an electronic compass of the device. The magnetometer 930 produces readings of the direction and magnitude of the magnetic field passing through the device. The orientation sensors (e.g., accelerometers and/or gyroscope sensors) determine the orientation of the device relative to the ground. In some embodiments, the orientation sensors determine how far and/or how fast the device is rotating. The display 950 receives visual data from the interactive application and displays it to the user.

The interactive application 910 receives gravity data from the orientation sensors 940. The interactive application of some embodiments uses the gravity data to determine which part of the device is closest to the ground and at what angle the device is tilted relative to the direction of gravity. The interactive application then sends display data (e.g., an image of a track with a ball on it) to the display 950. The interactive application places the image of the ball on the part of the track that is closest to the ground as determined by the gravity data.

As the device is rotated, different parts of the device are moved to become the lowest point on the device. The gravity data from the orientation sensors 940 update the interactive application 910 with this data. The interactive application 910 continues to show the ball at the lowest point of the track. The interactive application 910 also provides feedback to the user to indicate whether the user has been rotating the device slowly enough and whether the device is tilted enough. The interactive application 910 of some embodiments determines both the rotation speed and the tilt of the device from the gravity data. The interactive application 910 determines the rotation speed based on how fast the direction of gravity changes relative to the device. The interactive application 910 determines the tilt of the device based on the angle between the device and the direction of gravity.

While the user is rotating the device, the calibration application 920 of some embodiments repeatedly receives readings of the magnetic field from the magnetometer 930 and orientation data from the orientation sensors 940. The calibration application 920 uses the magnetic field readings and the orientation data to calibrate the electronic compass of the device. When the compass is calibrated, the calibration application 920 sends a message to the interactive application 910 to inform the interactive application 910 that the calibration is done. In some embodiments, interactive application 910 then stops sending display data to the display 950.

In the embodiment of FIG. 9, the interactive application and the calibration application are described as separate applications. However, in other embodiments the functions described for the separate applications are performed by a single application.

III. Calibration Based on Magnetic Field Readings

The calibration application of some embodiments measures magnetic fields with a magnetometer of the device. The application determines what magnetic fields are generated by the device and what magnetic fields are external to the device. The applications are then able to subtract the internal magnetic fields from the measured magnetic fields to determine the external magnetic fields (e.g., the Earth's magnetic field).

As described above, the device of some embodiments has a micro-electromechanical magnetometer or other type of magnetometer that is able to determine the magnitude and direction of the magnetic field that passes through the magnetometer. The magnetic field passing through the magnetometer is the vector combination of the external magnetic field and fields generated internally by the device (the "local interference field"). The calibration method of some embodiments allows a calibration application to distinguish between externally generated and internally generated magnetic fields.

In some embodiments, the magnetometer is a 3-axis magnetometer that is able to identify magnetic field components in three axial directions (e.g., x, y, and z directions of an orthogonal coordinate system). FIG. 10 conceptually illustrates the magnetic measurement space used to determine the local interference fields. The figure includes an example of a mobile device 1000, a magnetic field plot 1010, with plotted magnetic field data points 1011, measured vector 1012, calculated sphere 1014, offset vector 1016, and external field vector 1018.

The mobile device 1000 in the figure is a smart phone with a 3-axis magnetic sensor (magnetometer) 1002 and a loud speaker 1004. The magnetometer 1002 detects the strength and direction of magnetic fields impinging on the magnetometer 1002. The loud speaker 1004 creates sounds, but is shown here because it contributes to a local interference field. In some embodiments, other components of the device 1000 also contribute to the local interference field.

Magnetic field plot 1010 is a 3 dimensional graph with x-, y-, and z-axes that represent the strength of the magnetic field vector along those directions (e.g., a displacement along the x-axis indicates that the measured magnetic field vector has a component along the x-axis). The illustrated plot 1010 is a conceptual example of the type of data the application uses to calculate the local interference field and the external field. The magnetometer 1002 determines the direction and strength of the magnetic field relative to the axes (x, y, and z) of the mobile device 1000. Accordingly, from the perspective of the magnetometer 1002, as the mobile device 1000 is rotated, the device remains still while the universe revolves around it.

As shown in the plot 1010, each magnetic field measurement is recorded as a data point 1011. Measured vector 1012 represents the value of one such data point 1011. The vectors 1012 and 1018 will be referred to in the plural because such a pair of vectors could be drawn for each data point 1011. From the perspective of the mobile device 1000, the local interference field (represented by vector 1016) remains constant in magnitude and direction (although both the magnitude and direction are unknown when the measurements are taken). As a result of the constant value of the interference field relative to the coordinate system of the device (i.e., the x, y, and z coordinate system shown on the device 1000) the vector 1016 of the interference field points at a single location regardless of the orientation of the device. The location is not directly measurable. It must be calculated based on the data points 1011, which are the only directly measurable points on the plot 1010.

As mentioned above, the measured vectors 1012 are the vector additions of the interference field offset vector 1016 and the external field vectors 1018. Therefore, the measured vector 1012 can be represented by starting at the point of vector 1016 and extending away from that point by an amount equal to the strength of the external field vectors 1018. In other words, from the perspective of the mobile device 1000, the external magnetic field (represented by external field vectors 1018) maintains the same strength (i.e., the length of the external field vectors 1018 remains constant) and revolves around the end of the vector 1016.

By definition, the surface of a sphere is the set of points in 3-dimensions that are a particular distance from a particular point. Therefore, assuming that the external field vectors 1018 have a constant magnitude and the local interference field offset vector 1016 remains constant in magnitude and direction relative to the device as the device is rotated, the measured vectors 1012 will all lie on the surface of a sphere 1014, centered on the end of the vector 1016 and with a radius equal to the strength of the external field vectors 1018. The data points 1011 each lie on the surface of the sphere 1014. Accordingly, by identifying the locations of multiple data points 1011, the application can calculate the location of the center of the sphere 1014, which, as mentioned above, is the location that the vector 1016 points to. Therefore, by calculating the location of the center of the sphere 1014 the application identifies the local interference field.

The 3D calibration process of some embodiments requires a varied set of data points on the sphere 1014. Specifically, the points must be spread out sufficiently in order for the application of some embodiments to accurately calculate the center of the sphere 1014. Mathematically, the center of a sphere can be calculated from a small number data points (e.g., 2, 3, or 4 data points, depending on the angular measurements and calculation methods that the calibration application uses). Thus, in some embodiments, the center of the sphere 1014 can be calculated given a small number of data points 1011 on the surface of sphere 1014 and the orientation of the device when each point was measured.

However, in some embodiments, more than the minimum number of data points 1011 are used to calculate the center of the sphere 1014. Additionally, in some embodiments, the data points 1011 used to calculate the center of the sphere are taken from widely spread locations on the surface of the sphere.

The applications of some embodiments use more than the minimum number of points (and use widely spread points) because the measurements of the magnetic fields and orientations are not perfect. There is some margin for error in the measurement of both the magnetic field and the angles of the device for each data point 1011. By using multiple data points 1011 from widely spread locations on the sphere (e.g., measured at widely spread orientations of the device) the application reduces the margin of error for the calculated center of the sphere and therefore the calculated local interference field. The calibration applications of some embodiments use a Kalman filter to determine the orientation of the device and the direction of the measured magnetic field.

The compass calibration application identifies a series of magnetic field vectors, each representing the direction and strength of the measured magnetic field when the device is oriented in a particular direction. The external magnetic field vector points in a particular direction relative to the device (e.g., device 300 of FIG. 3). If the user rotates the device around a particular line, (e.g., the line from the center of the base of virtual pin 312 of FIG. 3 through the point of virtual pin 312), then from the perspective of the device, the local interference field remains constant and the external magnetic field revolves around the device.

One of ordinary skill in the art will understand that the references here to a sphere are meant as a convenience, understood to include not just a perfect sphere but also a distorted one such as an ellipsoid. That is because the strength of the external field may be somewhat affected by the orientation of the mobile device in some embodiments (e.g., due to components of the mobile phone interfering with the field more in one direction than another).

While some embodiments use the above described method to calibrate the compass, other methods of calibrating the compass are used in some other embodiments. For example, in some embodiments, the device measures the external magnetic fields in two dimensions rather than three dimensions.

IV. Mobile Device

Figure 11:
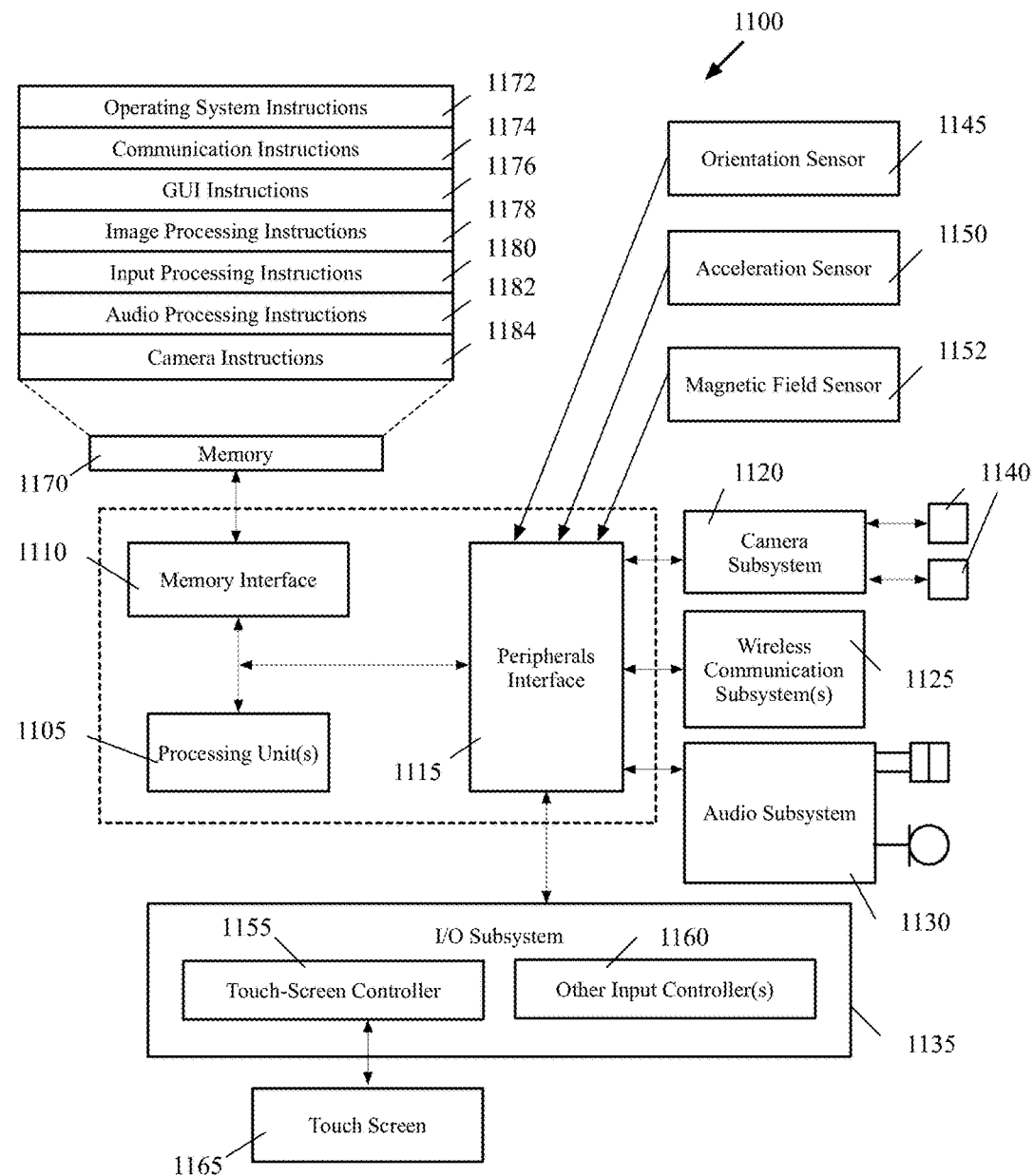
FIG. 11 is an example of an architecture of a mobile computing device that implements applications of some embodiments.

The image organizing, editing, and viewing applications of some embodiments operate on mobile devices, such as smartphones (e.g., iPhones®) and tablets (e.g., iPads®). FIG. 11 is an example of an architecture 1100 of such a mobile computing device. Examples of mobile computing devices include smartphones, tablets, laptops etc. As shown, the mobile computing device 1100 includes one or more processing units 1105, a memory interface 1110 and a peripherals interface 1115.

The peripherals interface 1115 is coupled to various sensors and subsystems, including a camera subsystem 1120, a wireless communication subsystem(s) 1125, an audio subsystem 1130, an I/O subsystem 1135, etc. The peripherals interface 1115 enables communication between the processing units 1105 and various peripherals. For example, an orientation sensor 1145 (e.g., a gyroscope) and an acceleration sensor 1150 (e.g., an accelerometer) is coupled to the peripherals interface 1115 to facilitate orientation and acceleration functions. Similarly, a magnetic field sensor 1152 (e.g., a magnetometer) is coupled to the peripherals interface to help identify direction by detecting geomagnetic fields (e.g., identifying a direction of the North Magnetic Pole).

The camera subsystem 1120 is coupled to one or more optical sensors 1140 (e.g., a charged coupled device (CCD) optical sensor, a complementary metal-oxide-semiconductor (CMOS) optical sensor, an ambient light detecting sensor etc.). The camera subsystem 1120 coupled with the optical sensors 1140 facilitates camera functions, such as image and/or video data capturing. The wireless communication subsystem 1125 serves to facilitate communication functions. In some embodiments, the wireless communication subsystem 1125 includes radio frequency receivers and transmitters, and optical receivers and transmitters (not shown in FIG. 11). These receivers and transmitters of some embodiments are implemented to operate over one or more communication networks such as a GSM network, a Wi-Fi network, a Bluetooth network, etc. The audio subsystem 1130 is coupled to a speaker to output audio (e.g., to output voice navigation instructions). Additionally, the audio subsystem 1130 is coupled to a microphone to facilitate voice-enabled functions, such as voice recognition (e.g., for searching), digital recording, etc.

The I/O subsystem 1135 involves the transfer between input/output peripheral devices, such as a display, a touch screen, etc., and the data bus of the processing units 1105 through the peripherals interface 1115. The I/O subsystem 1135 includes a touch-screen controller 1155 and other input controllers 1160 to facilitate the transfer between input/output peripheral devices and the data bus of the processing units 1105. As shown, the touch-screen controller 1155 is coupled to a touch screen 1165. The touch-screen controller 1155 detects contact and movement on the touch screen 1165 using any of multiple touch sensitivity technologies. The other input controllers 1160 are coupled to other input/control devices, such as one or more buttons. Some embodiments include a near-touch sensitive screen and a corresponding controller that can detect near-touch interactions instead of or in addition to touch interactions.

The memory interface 1110 is coupled to memory 1170. In some embodiments, the memory 1170 includes volatile memory (e.g., high-speed random access memory), non-volatile memory (e.g., flash memory), a combination of volatile and non-volatile memory, and/or any other type of memory. As illustrated in FIG. 11, the memory 1170 stores an operating system (OS) 1172. The OS 1172 includes instructions for handling basic system services and for performing hardware dependent tasks.

The memory 1170 also includes communication instructions 1174 to facilitate communicating with one or more additional devices; graphical user interface instructions 1176 to facilitate graphic user interface processing; image processing instructions 1178 to facilitate image-related processing and functions; input processing instructions 1180 to facilitate input-related (e.g., touch input) processes and functions; audio processing instructions 1182 to facilitate audio-related processes and functions; and camera instructions 1184 to facilitate camera-related processes and functions. The instructions described above are merely exemplary and the memory 1170 includes additional and/or other instructions in some embodiments. For instance, the memory for a smartphone may include phone instructions to facilitate phone-related processes and functions. Additionally, the memory may include instructions for an image organizing, editing, and viewing application. The above-identified instructions need not be implemented as separate software programs or modules. Various functions of the mobile computing device can be implemented in hardware and/or in software, including in one or more signal processing and/or application specific integrated circuits.

While the components illustrated in FIG. 11 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 11 may be split into two or more integrated circuits.

Although the above described mobile device is used by applications of some embodiments, other mobile devices such as map and/or navigation devices also include compasses and applications embodying the feedback system of some embodiments.

V. Computer System

Figure 12:
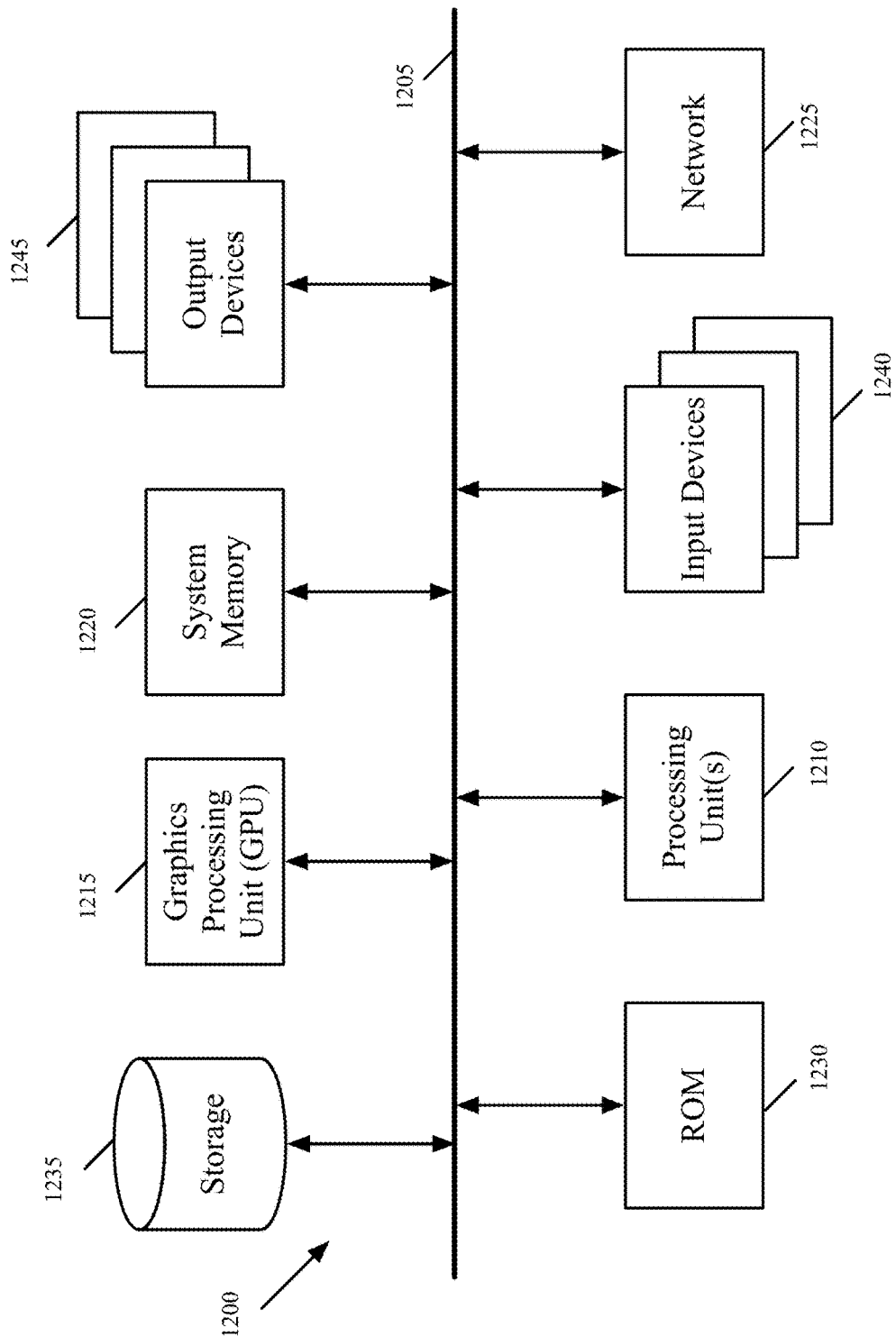
FIG. 12 conceptually illustrates another example of an electronic system with which some embodiments of the invention are implemented.

FIG. 12 conceptually illustrates another example of an electronic system 1200 with which some embodiments of the invention are implemented. The electronic system 1200 may be a computer (e.g., a tablet computer, laptop, or other movable computer, etc.), phone, PDA, or any other sort of electronic or computing device. Such an electronic system includes various types of computer readable media and interfaces for various other types of computer readable media. Electronic system 1200 includes a bus 1205, processing unit(s) 1210, a graphics processing unit (GPU) 1215, a system memory 1220, a network 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the GPU 1215, the system memory 1220, and the permanent storage device 1235.

From these various memory units, the processing unit(s) 1210 retrieves instructions to execute and data to process in order to execute the processes of the invention. The processing unit(s) may be a single processor or a multi-core processor in different embodiments. Some instructions are passed to and executed by the GPU 1215. The GPU 1215 can offload various computations or complement the image processing provided by the processing unit(s) 1210.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash memory device, etc., and its corresponding drive) as the permanent storage device. Like the permanent storage device 1235, the system memory 1220 is a read-and-write memory device. However, unlike storage device 1235, the system memory 1220 is a volatile read-and-write memory, such a random access memory. The system memory 1220 stores some of the instructions and data that the processor needs at runtime. In some embodiments, the invention's processes are stored in the system memory 1220, the permanent storage device 1235, and/or the read-only memory 1230. For example, the various memory units include instructions for processing multimedia clips in accordance with some embodiments. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alphanumeric keyboards and pointing devices (also called "cursor control devices"), cameras (e.g., webcams), microphones or similar devices for receiving voice commands, etc. The input devices also include any sensors that deliver data garnered from the real word (e.g., temperature sensors, magnetometers, etc.). The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

What is claimed is:

1. A method performed by an electronic device with a display, an electronic compass, and a compass calibration application, comprising:
  displaying a set of instructions on the display of the electronic device to change the orientation of the electronic device through a set of interactive actions that allow the compass calibration application to calibrate the electronic compass;
  providing instructional feedback regarding the set of interactive actions to indicate a quality of the changes in orientation of the electronic device, wherein providing the instructional feedback comprises:
    detecting a first sequence of changes in orientation of the device; and
    in response to detecting the first sequence of changes in orientation of the device:
      displaying an image of an object moving past a first location on the display and a second location on the display in accordance with the first sequence of changes in orientation of the electronic device; and
      in accordance with a determination that a portion of the first sequence of changes in orientation of the device that corresponded to movement of the object past the first location met first quality criteria and that a portion of the first sequence of changes in orientation of the device that corresponded to movement of the object past the second location did not meet the first quality criteria, displaying visual feedback at the first location that indicates the first quality of the changes in orientation of the electronic device without displaying the visual feedback at the second location that indicates the first quality of the changes in orientation of the electronic device; and,
  upon determining that the compass calibration application has fully completed the calibration of the electronic compass, displaying an indication of the completion of the calibration of the electronic compass on the display.

2. The method of claim 1, wherein the compass calibration application requires re-orienting the electronic device to at least a threshold number of different orientations in order to calibrate the electronic compass.

3. The method of claim 1 further comprising measuring the re-orientation of the electronic device to account for any new interactive actions.

4. The method of claim 3, wherein measuring the re-orientation of the device comprises identifying, based on an accelerometer reading, a tilt angle of the electronic device.

5. The method of claim 4, wherein measuring the re-orientation of the electronic device further comprises, based on repeated accelerometer readings, determining a rotation speed of the electronic device.

6. The method of claim 5, wherein the rotation speed is a rotation speed about an axis in the direction of gravity.

7. The method of claim 1, wherein providing the instructional feedback comprises displaying an image of a ball on a track, wherein the ball is displayed at the lowest point of the track.

8. The method of claim 7, wherein providing the instructional feedback further comprises displaying an image of lines growing from the track, the length of the lines indicating the quality of the re-orientation.

9. The method of claim 8, wherein the quality of the re-orientation is determined based on a tilt angle and a rotation speed of the electronic device.

10. The method of claim 8 further comprising:
  displaying the lines with a first length when an orientation and a speed of the electronic device are within a first set of parameters; and
  displaying the lines with a second length when the orientation and the speed of the electronic device are within a second set of parameters.

11. The method of claim 1, wherein moving the object on the display in accordance with a change in orientation of the device includes moving the object downward relative to gravity as the orientation of the device changes.

12. The method of claim 1, wherein the providing the instructional feedback includes outputting tactile feedback.

13. The method of claim 1, further comprising:
  after detecting the first sequence of changes in orientation of the device, detecting a second sequence of changes in orientation of the device; and,
  in response to detecting the second sequence of changes in orientation of the device:
    displaying the image of the object moving past the second location on the display for a second time, after the first time, in accordance with the second sequence of changes in orientation of the electronic device; and
    in accordance with a determination that a portion of the second sequence of changes in orientation of the device that corresponded to movement of the object past the second location a second time met the first quality criteria, displaying the visual feedback at the second location that indicates the first quality of the second sequence of changes in orientation of the electronic device.

14. The method of claim 1, further comprising:
  in response to detecting the first sequence of changes in orientation of the device, displaying visual feedback at the second location that corresponds to a second quality that is lower than the first quality;
  after detecting the first sequence of changes in orientation of the device, detecting a second sequence of changes in orientation of the device; and,
  in response to detecting the second sequence of changes in orientation of the device:
    displaying the image of the object moving past the second location on the display for a second time, after the first time, in accordance with the second sequence of changes in orientation of the electronic device; and
    in accordance with a determination that a portion of the second sequence of changes in orientation of the device that corresponded to movement of the object past the second location a second time met the first quality criteria, displaying the visual feedback at the second location that indicates the first quality of the second sequence of changes in orientation of the electronic device.

15. An electronic device comprising:
a display;
an electronic compass;
one or more processors;
memory; and
one or more programs, wherein the one or more programs are stored in the memory and configured to be executed by the one or more processors, the one or more programs including instructions for:
displaying a set of instructions on the display of the electronic device to change the orientation of the electronic device through a set of interactive actions that allow the compass calibration application to calibrate the electronic compass;
providing instructional feedback regarding the set of interactive actions to indicate a quality of the changes in orientation of the electronic device, wherein providing the instructional feedback comprises:
detecting a first sequence of changes in orientation of the device; and
in response to detecting the first sequence of changes in orientation of the device:
displaying an image of an object moving past a first location on the display and a second location on the display in accordance with the first sequence of changes in orientation of the electronic device; and,
in accordance with a determination that a portion of the first sequence of changes in orientation of the device that corresponded to movement of the object past the first location met first quality criteria and that a portion of the first sequence of changes in orientation of the device that corresponded to movement of the object past the second location did not meet the first quality criteria, displaying visual feedback at the first location that indicates the first quality of the changes in orientation of the electronic device without displaying the visual feedback at the second location that indicates the first quality of the changes in orientation of the electronic device; and,
upon determining that the compass calibration application has fully completed the calibration of the electronic compass, displaying an indication of the completion of the calibration of the electronic compass on the display.

16. The electronic device of claim 15, wherein the compass calibration application requires re-orienting the electronic device to at least a threshold number of different orientations in order to calibrate the electronic compass.

17. The electronic device of claim 15, further comprising instructions for measuring the re-orientation of the electronic device to account for any new interactive actions.

18. The electronic device of claim 17, wherein measuring the re-orientation of the device comprises identifying, based on an accelerometer reading, a tilt angle of the electronic device.

19. The electronic device of claim 18, wherein measuring the re-orientation of the electronic device further comprises, based on repeated accelerometer readings, determining a rotation speed of the electronic device.

20. The electronic device of claim 19, wherein the rotation speed is a rotation speed about an axis in the direction of gravity.

21. The electronic device of claim 15, wherein providing the instructional feedback comprises displaying an image of a ball on a track, wherein the ball is displayed at the lowest point of the track.

22. The electronic device of claim 21, wherein providing the instructional feedback further comprises displaying an image of lines growing from the track, the length of the lines indicating the quality of the re-orientation.

23. The electronic device of claim 22, wherein the quality of the re-orientation is determined based on a tilt angle and a rotation speed of the electronic device.

24. The electronic device of claim 22 further comprising instructions for:
displaying the lines with a first length when an orientation and a speed of the electronic device are within a first set of parameters; and
displaying the lines with a second length when the orientation and the speed of the electronic device are within a second set of parameters.

25. The electronic device of claim 15, wherein moving the object on the display in accordance with a change in orientation of the device includes moving the object downward relative to gravity as the orientation of the device changes.

26. The electronic device of claim 15, wherein the providing the instructional feedback includes outputting tactile feedback.

27. The electronic device of claim 15, including instructions for:
after detecting the first sequence of changes in orientation of the device, detecting a second sequence of changes in orientation of the device; and,
in response to detecting the second sequence of changes in orientation of the device:
displaying the image of the object moving past the second location on the display for a second time, after the first time, in accordance with the second sequence of changes in orientation of the electronic device; and
in accordance with a determination that a portion of the second sequence of changes in orientation of the device that corresponded to movement of the object past the second location a second time met the first quality criteria, displaying the visual feedback at the second location that indicates the first quality of the second sequence of changes in orientation of the electronic device.

28. The electronic device of claim 15, including instructions for:
in response to detecting the first sequence of changes in orientation of the device, displaying visual feedback at the second location that corresponds to a second quality that is lower than the first quality;
after detecting the first sequence of changes in orientation of the device, detecting a second sequence of changes in orientation of the device; and,
in response to detecting the second sequence of changes in orientation of the device:
displaying the image of the object moving past the second location on the display for a second time, after the first time, in accordance with the second sequence of changes in orientation of the electronic device; and
in accordance with a determination that a portion of the second sequence of changes in orientation of the device that corresponded to movement of the object past the second location a second time met the first quality criteria, displaying the visual feedback at the second location that indicates the first quality of the second sequence of changes in orientation of the electronic device.

29. A non-transitory computer readable storage medium storing one or more programs that, when executed by an electronic device having a display, an electronic compass, and a compass calibration application, cause the electronic device to:
display a set of instructions on the display of the electronic device to change the orientation of the electronic device through a set of interactive actions that allow the compass calibration application to calibrate the electronic compass;
provide instructional feedback regarding the set of interactive actions to indicate a quality of the changes in orientation of the electronic device, wherein providing the instructional feedback comprises:
detecting a first sequence of changes in orientation of the device; and
in response to detecting the first sequence of changes in orientation of the device:
displaying an image of an object moving past a first location on the display and a second location on the display in accordance with the first sequence of changes in orientation of the electronic device; and
in accordance with a determination that a portion of the first sequence of changes in orientation of the device that corresponded to movement of the object past the first location met first quality criteria and that a portion of the first sequence of changes in orientation of the device that corresponded to movement of the object past the second location did not meet the first quality criteria, displaying visual feedback at the first location that indicates the first quality of the changes in orientation of the electronic device without displaying the visual feedback at the second location that indicates the first quality of the changes in orientation of the electronic device; and,
upon determining that the compass calibration application has fully completed the calibration of the electronic compass, display an indication of the completion of the calibration of the electronic compass on the display.

30. The non-transitory computer readable storage medium of claim 29, wherein the compass calibration application requires re-orienting the electronic device to at least a threshold number of different orientations in order to calibrate the electronic compass.

31. The non-transitory computer readable storage medium of claim 29, wherein the one or more programs further include instructions that when executed by the electronic device cause the electronic device to measure the re-orientation of the electronic device to account for any new interactive actions.

32. The non-transitory computer readable storage medium of claim 31, wherein measuring the re-orientation of the device comprises identifying, based on an accelerometer reading, a tilt angle of the electronic device.

33. The non-transitory computer readable storage medium of claim 32, wherein measuring the re-orientation of the electronic device further comprises, based on repeated accelerometer readings, determining a rotation speed of the electronic device.

34. The non-transitory computer readable storage medium of claim 33, wherein the rotation speed is a rotation speed about an axis in the direction of gravity.

35. The non-transitory computer readable storage medium of claim 29, wherein providing the instructional feedback comprises displaying an image of a ball on a track, wherein the ball is displayed at the lowest point of the track.

36. The non-transitory computer readable storage medium of claim 35, wherein providing the instructional feedback further comprises displaying an image of lines growing from the track, the length of the lines indicating the quality of the re-orientation.

37. The non-transitory computer readable storage medium of claim 36, wherein the quality of the re-orientation is determined based on a tilt angle and a rotation speed of the electronic device.

38. The non-transitory computer readable storage medium of claim 36, wherein the one or more programs further include instructions that when executed by the electronic device cause the electronic device to:
display the lines with a first length when an orientation and a speed of the electronic device are within a first set of parameters; and
display the lines with a second length when the orientation and the speed of the electronic device are within a second set of parameters.

39. The non-transitory computer readable storage medium of claim 29, wherein moving the object on the display in accordance with a change in orientation of the device includes moving the object downward relative to gravity as the orientation of the device changes.

40. The non-transitory computer readable storage medium of claim 29, wherein the providing the instructional feedback includes outputting tactile feedback.

41. The non-transitory computer readable storage medium of claim 29, including one or more programs that, when executed by the electronic device, cause the electronic device to:
after detecting the first sequence of changes in orientation of the device, detect a second sequence of changes in orientation of the device; and,
in response to detecting the second sequence of changes in orientation of the device:
display the image of the object moving past the second location on the display for a second time, after the first time, in accordance with the second sequence of changes in orientation of the electronic device; and
in accordance with a determination that a portion of the second sequence of changes in orientation of the device that corresponded to movement of the object past the second location a second time met the first quality criteria, display the visual feedback at the second location that indicates the first quality of the second sequence of changes in orientation of the electronic device.

42. The non-transitory computer readable storage medium of claim 29, including one or more programs that, when executed by the electronic device, cause the electronic device to:
in response to detecting the first sequence of changes in orientation of the device, display visual feedback at the second location that corresponds to a second quality that is lower than the first quality;
after detecting the first sequence of changes in orientation of the device, detect a second sequence of changes in orientation of the device; and, in response to detecting the second sequence of changes in orientation of the device:
- display the image of the object moving past the second location on the display for a second time, after the first time, in accordance with the second sequence of changes in orientation of the electronic device; and
- in accordance with a determination that a portion of the second sequence of changes in orientation of the device that corresponded to movement of the object past the second location a second time met the first quality criteria, display the visual feedback at the second location that indicates the first quality of the second sequence of changes in orientation of the electronic device.

* * * * *